(12) United States Patent
Zhu et al.

(10) Patent No.: US 10,983,029 B2
(45) Date of Patent: Apr. 20, 2021

(54) ENGINE MISFIRE DETECTION

(71) Applicant: GM Global Technology Operations LLC, Detroit, MI (US)

(72) Inventors: Yongjie Zhu, Troy, MI (US); Jun-mo Kang, Ann Arbor, MI (US); Chen-fang Chang, Bloomfield Hills, MI (US); David J. Brooks, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 176 days.

(21) Appl. No.: 16/154,133

(22) Filed: Oct. 8, 2018

(65) Prior Publication Data

US 2020/0110004 A1 Apr. 9, 2020

(51) Int. Cl.
| | |
|---|---|
| *G01M 15/11* | (2006.01) |
| *F02D 41/00* | (2006.01) |
| *F02D 41/22* | (2006.01) |
| *F02D 35/02* | (2006.01) |

(52) U.S. Cl.
CPC ........... *G01M 15/11* (2013.01); *F02D 35/023* (2013.01); *F02D 41/0097* (2013.01); *F02D 41/222* (2013.01); *F02D 2200/1015* (2013.01)

(58) Field of Classification Search
CPC ... G01M 15/11; G01M 15/12; F02D 41/1498; F02D 2041/288; F02D 2200/1015; F02D 2200/1004; F02D 41/1497; F02D 2041/286; F02P 5/045; G01L 5/00; G01L 1/10
See application file for complete search history.

(56) References Cited

U.S. PATENT DOCUMENTS

| | | | | |
|---|---|---|---|---|
| 6,223,120 | B1* | 4/2001 | Williams | G01M 15/11 701/102 |
| 8,256,278 | B2* | 9/2012 | Lee | G01M 15/11 73/114.04 |
| 2007/0137289 | A1* | 6/2007 | Mathews | G01M 15/11 73/114.04 |
| 2008/0190184 | A1* | 8/2008 | Walters | G01M 15/11 73/114.02 |
| 2009/0234562 | A1* | 9/2009 | Wolf | F02M 26/47 701/108 |
| 2011/0072893 | A1* | 3/2011 | Malaczynski | G01M 15/11 73/114.03 |

FOREIGN PATENT DOCUMENTS

| | | |
|---|---|---|
| CN | 101839807 A | 9/2010 |
| CN | 105264204 A | 1/2016 |
| CN | 107795379 A | 3/2018 |
| JP | 08270490 A * | 10/1996 |

* cited by examiner

*Primary Examiner* — Brandi N Hopkins

(57) ABSTRACT

A method of detecting misfire in a combustion engine of a motor vehicle engine includes measuring a speed of a crankshaft, calculating a modal coefficient for each cylinder of the combustion engine, and indicating a misfire for at least one of the cylinders based on the calculation of the modal coefficients.

12 Claims, 6 Drawing Sheets

ENGINE MISFIRE DETECTION

INTRODUCTION

The present disclosure relates to detecting misfire of a cylinder in a combustion engine.

Many motor vehicles utilize combustion engines as the primary component of the propulsion unit for the motor vehicle. Typically, the combustion engine is a multi-cylinder engine. During the operation of the engine, one or more cylinders may misfire, which reduces the power output and efficiency of the engine. Pressure sensors may be employed to monitor the pressure in each cylinder to detect misfires and partial burn in the cylinders. Pressure sensors, however, are quite costly.

Thus, while current methods to detect misfire in a cylinder achieve their intended purpose, there is a need for a new and improved system and method for evaluating misfire in a cylinder.

SUMMARY

According to several aspects, a method of detecting misfire in a combustion engine of a motor vehicle engine includes measuring a speed of a crankshaft, calculating a modal coefficient for each cylinder of the combustion engine, and indicating a misfire for at least one of the cylinders based on the calculation of the modal coefficients.

In an additional aspect of the present disclosure, the speed of the crankshaft is measured with an encoder.

In another aspect of the present disclosure, the modal coefficient is a first modal coefficient.

In another aspect of the present disclosure, the method further includes calculating a standard deviation for the first modal coefficients for each cylinder.

In another aspect of the present disclosure, the standard deviation is calculated over a predetermined number of engine cycles.

In another aspect of the present disclosure, a misfire is indicated when the standard deviation of the first modal coefficient exceeds a threshold for at least one of the cylinders.

In another aspect of the present disclosure, the predetermined number of engine cycles is greater than about 50.

In another aspect of the present disclosure, measuring the speed of the crankshaft includes measuring a steady state speed of the crankshaft.

According to several aspects, a method of detecting misfire in a combustion engine of a motor vehicle engine includes measuring a speed of a crankshaft, calculating a first modal coefficient for each cylinder of the combustion engine, and indicating a misfire for at least one of the cylinders based on the calculation of the first modal coefficients.

In another aspect of the present disclosure, the speed of the crankshaft is measured with an encoder.

In another aspect of the present disclosure, the method further includes calculating a standard deviation for the first modal coefficients for each cylinder.

In another aspect of the present disclosure, the standard deviation is calculated over a predetermined number of engine cycles.

In another aspect of the present disclosure, a misfire is indicated when the standard deviation of the first modal coefficient exceeds a threshold for at least one of the cylinders.

In another aspect of the present disclosure, the predetermined number of engine cycles is greater than about 50.

In another aspect of the present disclosure, measuring the speed of the crankshaft includes measuring a steady state speed of the crankshaft.

According to several aspects, a method of detecting misfire in a combustion engine of a motor vehicle engine includes measuring a speed of a crankshaft, calculating a first modal coefficient for each cylinder of the combustion engine, calculating a standard deviation of the first modal coefficient of each cylinder, determining if the standard deviation of the first modal coefficient of each cylinder exceeds a threshold, and indicating a misfire for one or more of the cylinders of the standard deviation of the first modal coefficient of cylinder exceeds the threshold.

In another aspect of the present disclosure, the speed of the crankshaft is measured with an encoder.

In another aspect of the present disclosure, the standard deviation is calculated over a predetermined number of engine cycles.

In another aspect of the present disclosure, the predetermined number of engine cycles is greater than about 50.

In another aspect of the present disclosure, measuring the speed of the crankshaft includes measuring a steady state speed of the crankshaft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
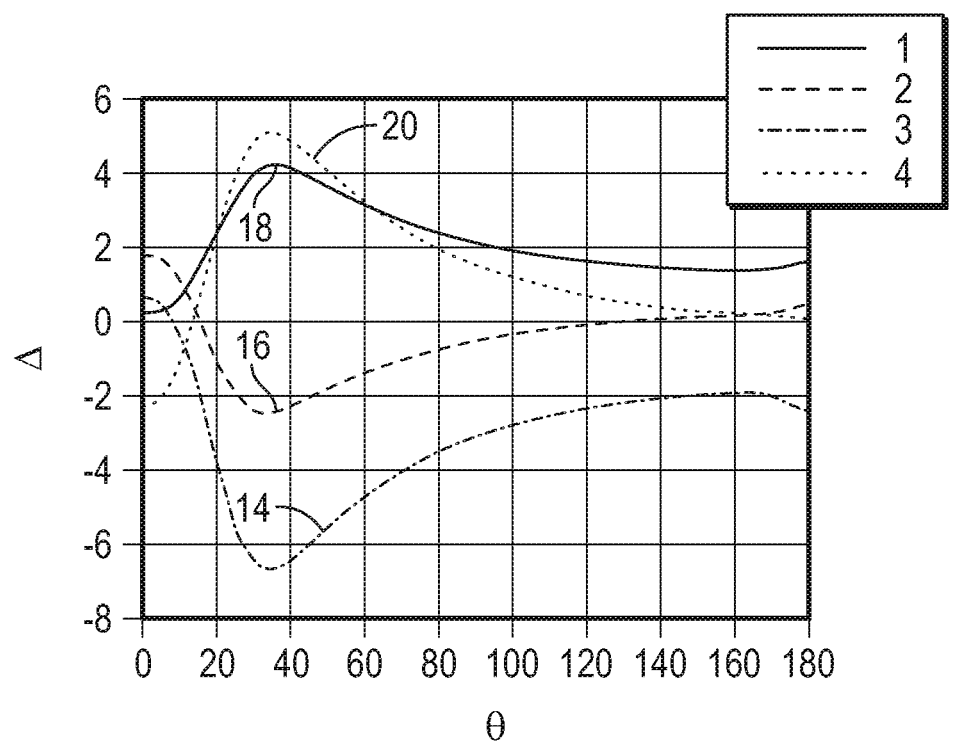
FIG. 1 is a plot of the deviation in engine speed from an ensemble averaged speed for a four cylinder engine.

Referring to FIG. 1, there is shown a plot of the deviation, Δ, of the engine crankshaft speed associated with each cylinder of a four cylinder engine over a crank angle, θ, in degrees. The deviation, Δ, for each cylinder 14, 16, 18 and 20 is determined by subtracting the average ensemble speed for all the cylinders from the measured engine speed associated with each cylinder.

By utilizing principal component analysis, similar to singular value decomposition, the data shown in FIG. 1 is decomposed into linearly uncorrelated signals identified as principle components through a linear transformation. The most significant mode is the first principle mode and a first modal coefficient (FMC) is identified for each cylinder.

Figure 2:
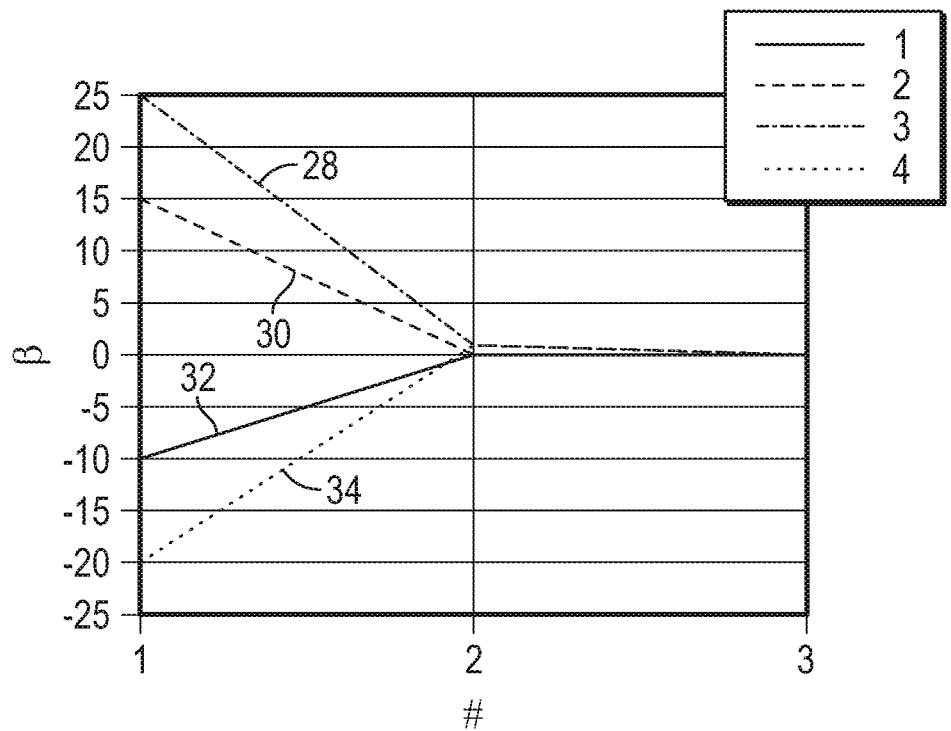
FIG. 2 is a plot of the principle modal component coefficients for each of the four cylinders.

Referring to FIG. 2, there is a plot of the modal coefficients, β, vs nodal number, #, for the principle component coefficients for cylinder 1, 32, cylinder 2, 30, cylinder 3, 28, and cylinder 4, 34, corresponding respectively to the plots 18, 16, 14, and 20 shown in FIG. 1. As can be readily seen, cylinder 3, 14 has the largest deviation in FIG. 1. This corresponds to the largest modal coefficient, β, of 25 along the plot 28 for a modal number, #, of 1. Hence, the first modal coefficients are utilized to determine deviations in the engine crankshaft speed.

Figure 3A:
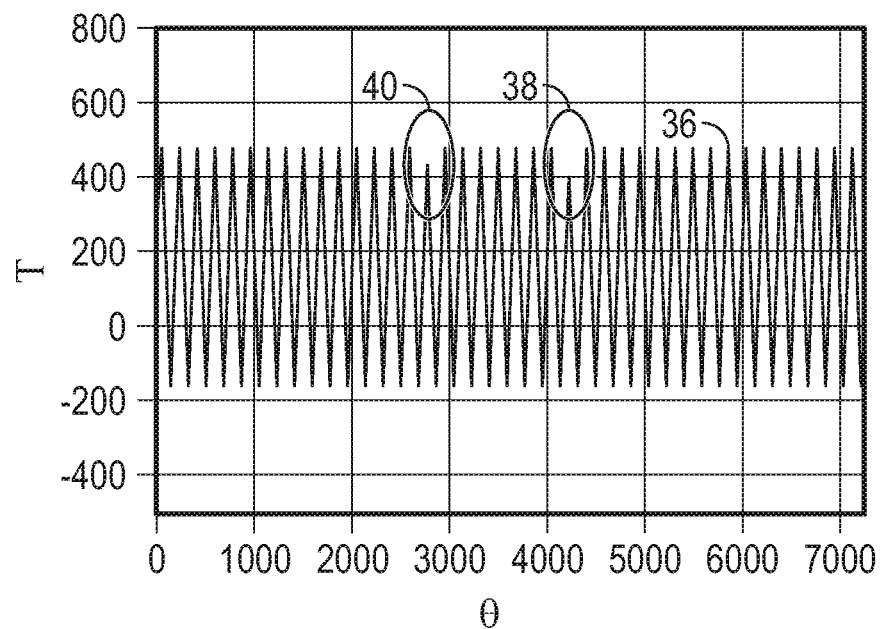
FIG. 3A is plot of the variation of the engine torque.
Figure 3B:
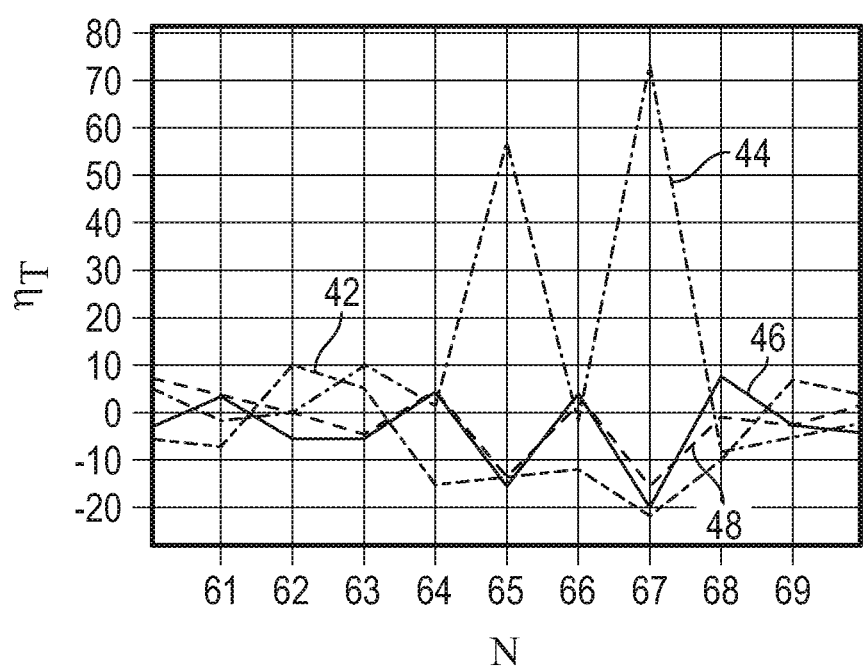
FIG. 3B is a plot of the first modal coefficients calculated from the torque variations shown in FIG. 3A.

For the sake of comparison, FIG. 3A shows the variation of the engine torque, T, over the crank angle, θ. Normal operation is identified by the peaks 36, while the misfires are identified by the reduced peaks in torque 38 and 40. Determination of the first modal coefficients of the torque variations or deviations is shown in FIG. 3B as a plot of the first modal coefficients, $\eta_\tau$, over a number, N, of engine cycles for cylinder 1, 46, cylinder 2, 48, cylinder 3, 44, and cylinder 4, 42. As can be seen in FIG. 3B, the largest first model coefficients are associated with the plot 44 for cylinder 3, identifying misfires in cylinder 3. These misfires correspond to the deviation of the torque 38 and 40 from the maximum peaks 36.

Figure 4A:
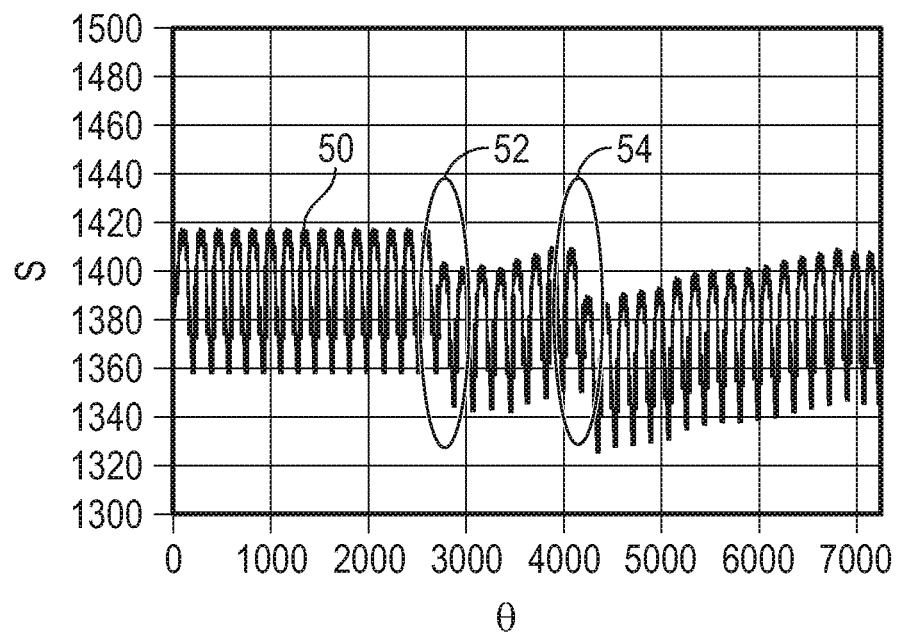
FIG. 4A is a plot of the crankshaft speed variations of the engine in accordance with principles of the present disclosure.
Figure 4B:
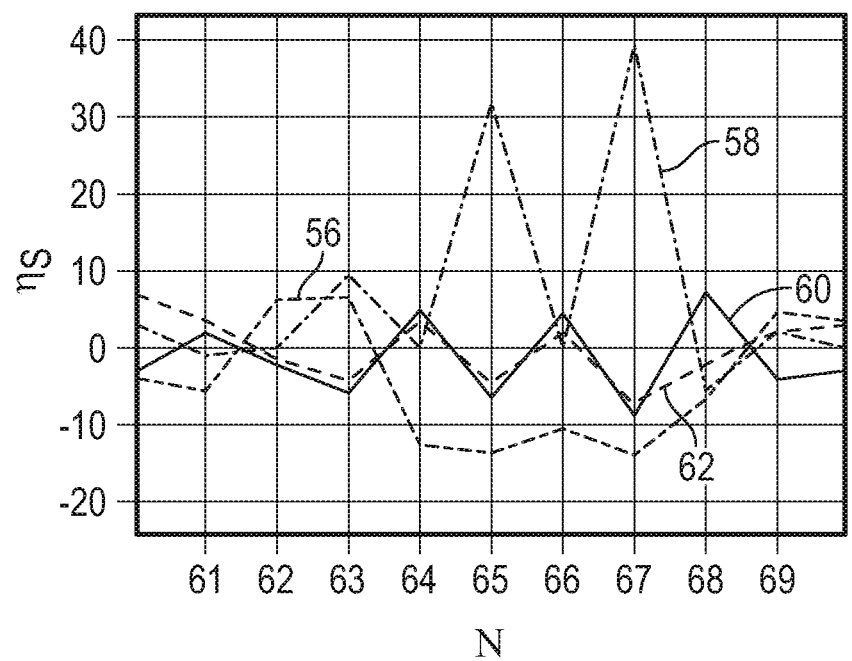
FIG. 4B is a plot of the first modal coefficients calculated from the crankshaft speed variations shown in FIG. 4A.

Referring to FIG. 4A, there is shown the engine speed, S, in rpm over the crank angle, θ. Normal operation is identified by the peaks 50, while the misfires are identified by the variations 52 and 54 from the peaks 50. Determination of the first modal coefficients of the speed variations or deviations is shown in FIG. 4B as a plot of the first modal coefficients, $\eta_s$, over a number, N, of engine cycles for cylinder 1, 60, cylinder 2, 62, cylinder 3, 58, and cylinder 4, 56. As can be seen in FIG. 4B, the largest first model coefficients are associated with the plot 58 for cylinder 3, identifying misfires in cylinder 3. These misfires correspond to the variation of the speed 52 and 54 from the maximum peaks 50.

Figure 5A:
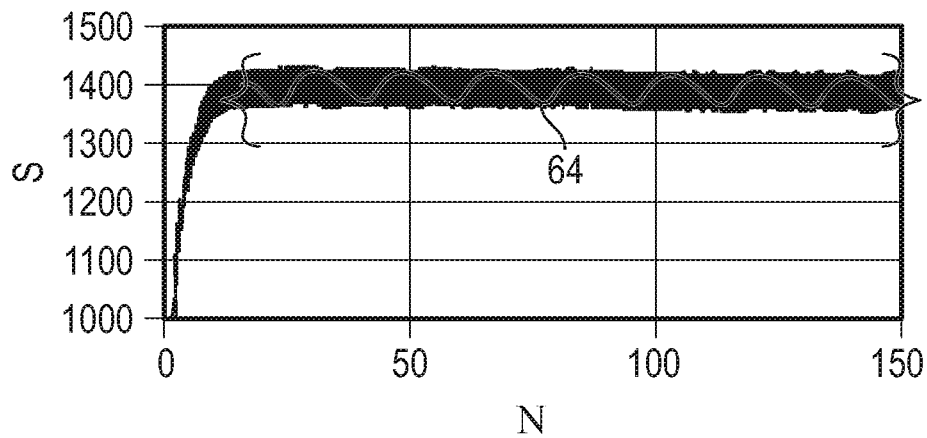
FIG. 5A is a plot of the engine speed in rpm of an N number of engine cycles for the normal operation of the four cylinder engine.
Figure 5B:
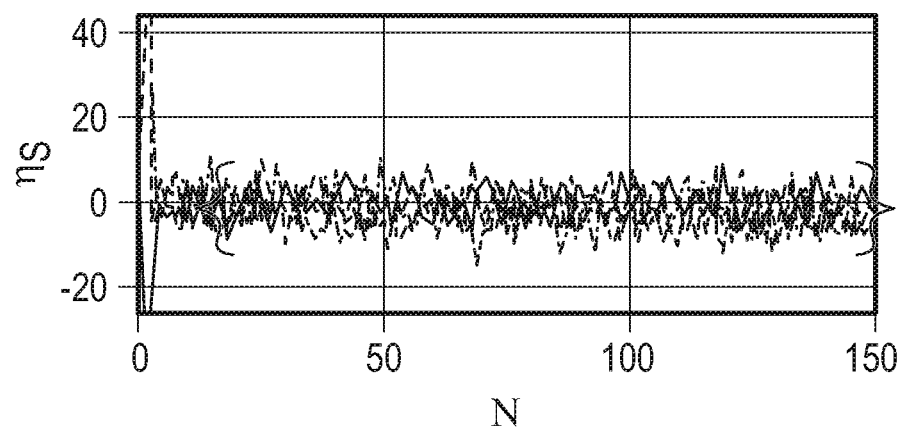
FIG. 5B is a plot the first modal coefficients of each of the four cylinders based on the variations of the engine speed shown in FIG. 5A.
Figure 5C:
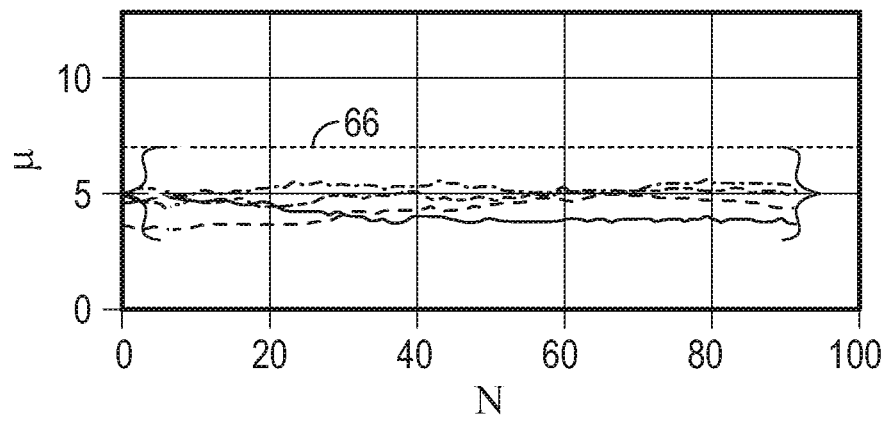
FIG. 5C is a plot of the standard deviations of the first modal coefficients shown in FIG. 5B.

Referring to FIG. 5A, there is shown plot 64 of the engine crankshaft speed in rpm over N number of engine cycles for the normal steady state operation of the four cylinder engine. And FIG. 5B shows the first modal coefficients, $\eta_s$, for the four cylinders over N number of cycles. Referring further to FIG. 5C, there is shown the determination of the standard deviation, μ, of the first modal coefficients identified in FIG. 5B for the four cylinders over N number of cycles. The horizontal line 66 in FIG. 5C identifies a threshold below which indicates normal operation of the four cylinder engine. Since the standard deviation of the first modal coefficient for each cylinder is below the threshold 66, FIG. 5C clearly indicates that the engine is operating normally.

Figure 6A:
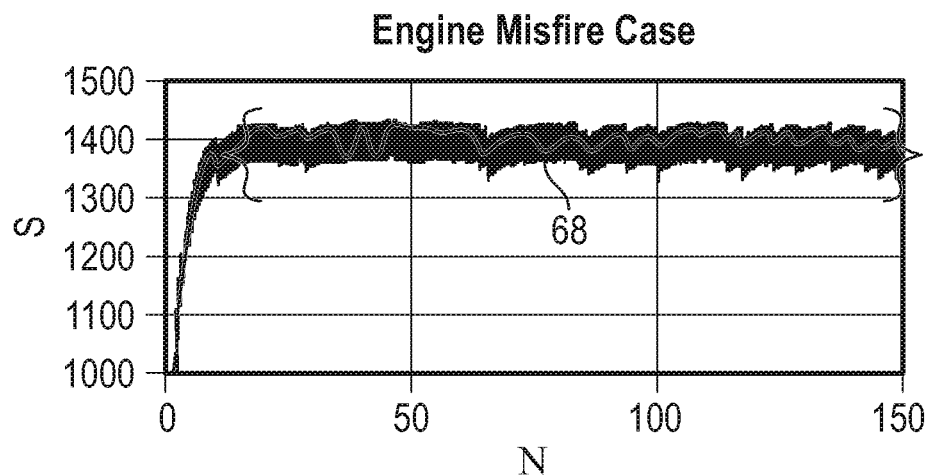
FIG. 6A is a plot of the engine speed in rpm of an N number of engine cycles of the four cylinder engine when there is a misfire.
Figure 6B:
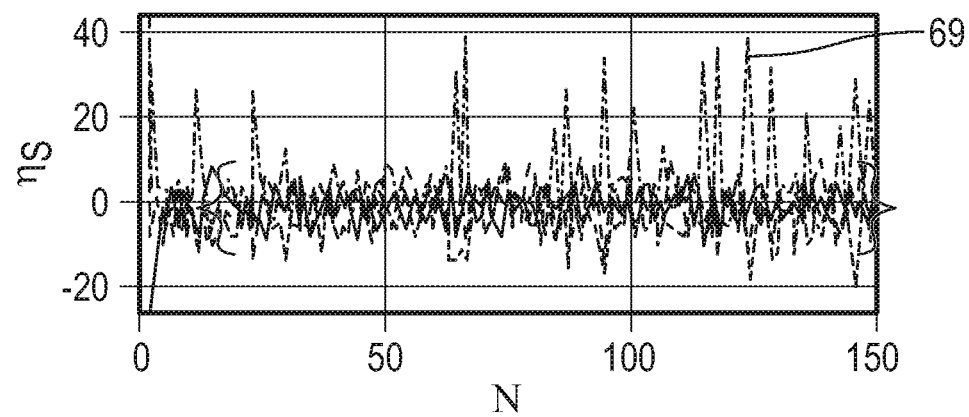
FIG. 6B is a plot the first modal coefficients of each of the four cylinders based on the variations of the engine speed shown in FIG. 6A.
Figure 6C:
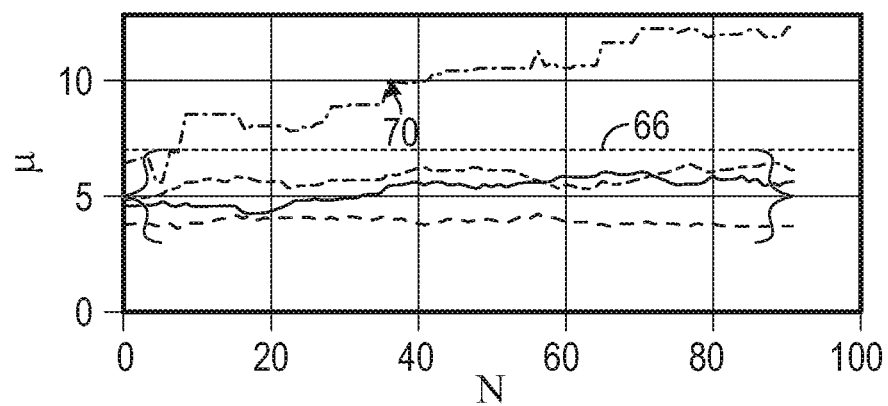
FIG. 6C is a plot of the standard deviations of the first modal coefficients shown in FIG. 6B.

Referring now to FIG. 6A, there is shown plot 68 of the engine crankshaft speed in rpm over N number of engine cycles for the steady state operation of the four cylinder engine when a cylinder is misfiring. And FIG. 6B shows the first modal coefficients, $\eta_s$, for the four cylinders over N number of cycles. Referring further to FIG. 6C, there is shown the determination of the standard deviation, μ, of the first modal coefficients identified in FIG. 6B for the four cylinders over N number of cycles. Again the horizontal line 66 in identifies a threshold below which indicates normal operation of the four cylinder engine. Since the standard deviation of the first modal coefficient for one of the cylinders above the threshold 66, FIG. 6C clearly indicates that the engine is operating with a misfiring cylinder.

Figure 7:
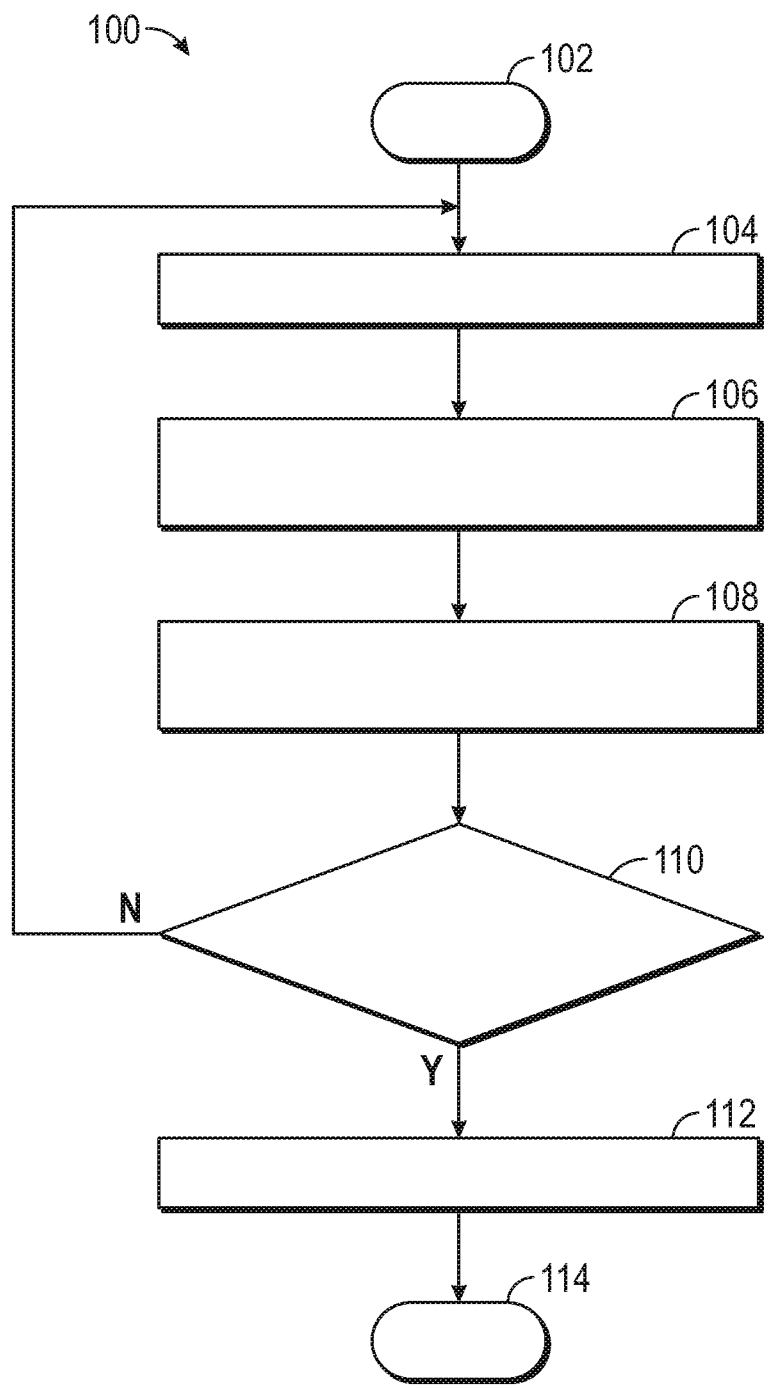
FIG. 7 is a flow diagram of a process for detecting misfire in an engine in accordance with the principles of the disclosure.

Turning now to FIG. 7, a process 100 is shown how the utilization of the first modal coefficients enable the determination of if a cylinder is misfiring. The process 100 begins in step 102. In step 104, steady state engine crankshaft speed is collected, for example, with an encoder. In step 106, the first modal coefficients are calculated for each engine cycle for each cylinder. Next, in step 108, the standard deviation of the first modal coefficients for each cylinder is calculated. The process 100 then advances to a step 110, where the process 100 determines if the standard deviations exceed a threshold for any of the cylinder. If the standard deviation does not exceed the threshold, the process 100 loops back to step 104. If the standard deviation does exceed the threshold, the process advances to stop 112, where the process 100 raises a flag for the cylinder with the standard deviation exceeding the threshold. The process 100 then stops in step 114.

In various arrangements, the aforementioned process is implemented as an algorithm in a processor such as an electronic control unit located within the motor vehicle. In particular arrangements, the algorithm is a software algorithm stored in a non-transitory computer readable mechanism associated with the electronic control unit.

A particular benefit of the present disclosure is the utilization of measuring the engine crankshaft speed to determine if a cylinder is misfiring, since speed sensors, such as, for example, encoders, are significantly less expensive than torque sensors. The process enables a driver of a motor vehicle or a technician providing maintenance to the motor vehicle to easily identify when the motor vehicle's engine is not operating properly, for example, by observing an engine warning light corresponding to step 112 of the process 100.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of detecting misfire in a combustion engine of a motor vehicle engine, the method comprising:
   measuring a speed of a crankshaft;
   calculating a deviation for each cylinder of the combustion engine by subtracting an average ensemble speed for all of the cylinders from the speed of the crankshaft;
   calculating a modal coefficient for each cylinder of the combustion engine from the deviation for each cylinder; and indicating a misfire for at least one of the cylinders based on the calculation of the modal coefficients.

2. The method of claim 1 wherein the speed of the crankshaft is measured with an encoder.

3. The method of claim 1 wherein the modal coefficient is a first modal coefficient.

4. The method of claim 3 wherein the standard deviation is calculated over a predetermined number of engine cycles.

5. The method of claim 4 wherein a misfire is indicated when the standard deviation of the first modal coefficient exceeds a threshold for at least one of the cylinders.

6. The method of claim 4 wherein the predetermined number of engine cycles is greater than about 50.

7. The method of claim 1 wherein measuring the speed of the crankshaft includes measuring a steady state speed of the crankshaft.

8. A method of detecting misfire in a combustion engine of a motor vehicle engine, the method comprising:
  measuring a speed of a crankshaft;
  calculating a deviation for each cylinder of the combustion engine by subtracting an average ensemble speed for all of the cylinders from the speed of the crankshaft;
  calculating a first modal coefficient for each cylinder of the combustion engine from the deviation for each cylinder;
  calculating a standard deviation of the first modal coefficient of each cylinder;
  determining if the standard deviation of the first modal coefficient of each cylinder exceeds a threshold; and
  indicating a misfire for one or more of the cylinders of the standard deviation of the first modal coefficient of cylinder exceeds the threshold.

9. The method of claim 8 wherein the speed of the crankshaft is measured with an encoder.

10. The method of claim 8 wherein the standard deviation is calculated over a predetermined number of engine cycles.

11. The method of claim 8 wherein measuring the speed of the crankshaft includes measuring a steady state speed of the crankshaft.

12. The method of 10 wherein the predetermined number of engine cycles is greater than about 50.

\* \* \* \* \*